United States Patent [19]
Olesen et al.

[11] Patent Number: 6,110,508
[45] Date of Patent: Aug. 29, 2000

[54] USE OF LIPASE IN BAKING

[75] Inventors: Tine Olesen, Veksø ; Joan Qi Si, Skodsborg, both of Denmark; Vahan Donelyan, Milan, Italy

[73] Assignee: Novo Nordisk A/S, Bagsvaerd, Denmark

[21] Appl. No.: 09/224,819

[22] Filed: Jan. 4, 1999

Related U.S. Application Data

[63] Continuation of application No. 08/755,717, Nov. 25, 1996, abandoned, which is a continuation of application No. 08/379,637, Feb. 6, 1995, abandoned, which is a continuation of application No. PCT/DK93/00274, Aug. 23, 1993.

[30] Foreign Application Priority Data

Aug. 21, 1992 [DK] Denmark ................ 1045/92

[51] Int. Cl.⁷ .................................................. A21D 10/00
[52] U.S. Cl. .......................... 426/20; 426/549; 426/653
[58] Field of Search ............................ 426/20, 35, 653, 426/549; 435/198

[56] References Cited

U.S. PATENT DOCUMENTS 3,368,903  2/1968  Johnson et al. ................ 99/91

FOREIGN PATENT DOCUMENTS

| | | |
|---|---|---|
| 0 109 244 | 5/1984 | European Pat. Off. . |
| 0 258 068 | 3/1988 | European Pat. Off. . |
| 0 305 216 | 3/1989 | European Pat. Off. . |
| 55-131340 | 10/1980 | Japan . |
| 55-153549 | 10/1980 | Japan . |
| 4-84848 | 4/1992 | Japan . |
| 89/06278 | 7/1989 | WIPO . |
| 91/14784 | 10/1991 | WIPO . |

OTHER PUBLICATIONS

Greenough et al., Food & Chemistry Toxicology, 34(2), pp. 161–166, 1996.

Fukuhara et al., Chem. Abs. No. 149878j, vol. 117, p. 728 (1992).

*Primary Examiner*—Keith D. Hendricks
*Attorney, Agent, or Firm*—Steve T. Zelson; Valeta Gregg

[57] ABSTRACT

A method of improving properties of a dough and/or a baked product made from dough by adding an enzyme preparation to the dough and/or to any ingredient and/or to any mixture of the dough ingredients, in which the enzyme preparation comprises a lipase derived from Humicola, and a second enzyme which is an amylase or a xylanase.

24 Claims, No Drawings

USE OF LIPASE IN BAKING

CROSS-REFERENCE TO RELATED APPLICATIONS

This application is a continuation of application Ser. No. 08/755,717 filed on Nov. 25, 1996 which is a continuation of Ser. No. 08/379,637 filed on Feb. 6, 1995, both now abandoned, which is a continuation of PCT/DK93/00274 filed on Aug. 23, 1993 and claims priority under 35 U.S.C. 119 of Danish application serial no. 1045/92 filed Aug. 21, 1992, the contents of which are fully incorporated herein by reference.

FIELD OF THE INVENTION

The present invention relates to a method of improving properties of a dough and/or of a baked product made from dough by use of a lipase preparation. Furthermore, the invention relates to a dough and baked product produced by the method, as well as to a dough conditioner, a bread-improving composition and a pre-mix comprising lipase for the preparation of dough.

BACKGROUND OF THE INVENTION

In the bread-making process it is known to add bread-improving additives and/or dough conditioners to the bread dough, the action of which, inter alia, results in improved texture, volume, flavour and freshness of the bread as well as improved machinability of the dough.

In recent years enzymes have been found to be useful as dough conditioners and/or bread-improving agents, in particular enzymes such as amylases and proteases which act on components present in large amounts in the dough.

Lipase (EC 3.1.1.3) is an enzyme belonging to the glycerol ester hydrolases, which catalyzes hydrolysis of ester bonds in triglycerides. The use of lipases in the preparation of bread has been suggested for smoothening and thereby improving the texture of bread, but it has been concluded that when lipase is used alone other properties of the bread such as bread volume, elasticity of the crumb and mouth-feel are deteriorated (JP-A 62-285749). In fact, the use of lipase in the baking industry has been stated as undesirable (Gams, 1976).

JP-A 62-285749 discloses a method of making bread, in which lipase is added to dough in admixture with vital gluten and lecithin. By the addition of vital gluten and lecithin the undesirable effects of lipase are stated to be avoided or diminished.

EP 468 731 discloses the use of a bread-improver comprising the enzyme glucose oxidase, optionally in combination with other enzymes such as hydrolases. Lipase is mentioned as one example of such hydrolase.

In both of the above references baking trials are described, in which lipase is added alone without addition of any of the other improving agents described in these references. These baking trials serve the purpose of illustrating the dissatisfactory results obtained by use of lipase alone as compared to the results obtained when lipase is used in admixture with the other improving agents described in these references. In EP 468 731 the lipase used for these trials have not been specified, whereas the lipase used in JP-A 62-285749 is stated to be Talipase, apparently a lipase produced by a species of the genus Rhizopus. In the baking trials disclosed in JP-A 62-285749, the lipase has been used in an amount which corresponds to at least 2240 Lipase Units (LU)/kg of flour.

None of the above-cited references discloses or suggests that the use of lipase in the preparation of dough and/or baked products may be desirable when used alone without any of the other bread-improving or dough-improving agents mentioned in the references.

DISCLOSURE OF THE INVENTION

It was therefore surprising to find that the use of lipase as such without addition of the above-mentioned bread-improving agents under suitable conditions may result in substantial improvements of dough as well as of baked products prepared from the dough. In particular, it was surprising to find that some of the properties, which in the above-cited references were stated to be deteriorated by the use of lipase (such as bread volume) in fact could be improved. The present invention is based on this finding.

Accordingly, in a first aspect the present invention relates to a method of improving properties of a dough and/or a baked product made from dough by adding an enzyme preparation to the dough and/or to any ingredient of the dough and/or to any mixture of the dough ingredients, in which method the enzyme preparation comprises a lipase of microbial origin which is added in an amount corresponding to at the most 2100 Lipase Units (LU) /kg of flour. The Lipase Units are further defined in the Materials and Methods section below.

While it could be expected that the use of lipase would only be suited for the preparation of dough and/or baked products containing a certain minimum amount of added fat or lipids (the substrate for lipase), it has surprisingly been found that lipase also exerts an advantageous effect in dough without any added fat or dough containing only low amounts of added fat. Accordingly, in a second important aspect, the present invention relates to a method of improving properties of a fat-free dough and/or a baked product made from dough by adding an enzyme preparation to the dough and/or to any ingredient of the dough and/or to any mixture of the dough ingredients, in which method the enzyme preparation comprises a lipase.

As far as the present inventors are aware the use of lipase in the preparation of dough and/or baked products without or containing only low amounts of added fat has never been suggested. The method according to this aspect of the invention is obviously attractive for the preparation of low-calorie dough and/or baked products.

In the present context, the term "fat" is intended to indicate any fat or lipid useful in the preparation of dough and baked products. Fats conventionally used for this purpose includes butter, margarine, shortening, oil, and the like, and may be of vegetable or animal origin or of a mixed vegetable and animal origin. The term "fat-free" as used herein is intended to indicate that the dough is substantially free from added fat.

In a third aspect the invention relates to a method of improving properties of a dough and/or of a baked product made from dough, the dough comprising an amount of added fat constituting at the most 3.5% by weight of the flour component(s) present in the dough, which method comprises adding an enzyme preparation comprising lipase to the dough and/or to any ingredient of the dough and/or to any mixture of the dough ingredients.

The term "improved properties" as used about the effect obtained on dough and/or baked products made from dough is according to the present invention is intended to be understood broadly, i.e. to include any property which may be improved by the action of lipase (in comparison with properties obtained when no lipase has been added).

In particular, it has been found that addition of lipase results in an increased volume and improved softness of the baked product. Also, an improved anti-staling effect is obtained, i.e. the crumb of the baked product become softer when lipase is added. Furthermore, the colour of the crumb of the baked product becomes more white when lipase is added to the dough. In addition, dough prepared by a method of the invention has been found to obtain an improved consistency, i.e. an increased softness and elasticity, which results in a more easily machinable dough. The machinability of dough is a critical parameter, e.g., in the industrial production of dough and baked products.

In further aspects the present invention relates to a dough or a baked product which have been prepared by a method of the invention, to a dough conditioner or a bread-improving composition substantially free from lecithin and/or vital gluten, which comprises a microbial lipase, as well as to a pre-mix for dough and/or baked products substantially free from added fat or comprising at the most 3.5% added fat by weight of flour component(s) of the pre-mix, which comprises a lipase enzyme.

In a final aspect, the invention relates to the use of lipase as a dough conditioner and/or a bread-improving agent for the preparation of dough and/or baked products made from dough substantially free from added fat or comprising at the most 3.5% of added fat by weight of the flour component(s) of the dough.

DETAILED DESCRIPTION OF THE INVENTION

The main triglyceride content in conventional bread dough containing no added fat is found in the flour component(s) of the dough and constitutes typically about 1–3% by weight of the dough. It is contemplated that the lipase enzyme used in accordance with the present invention is able to reach and act on these low amounts of triglycerides, even though free water molecules are virtually absent in the dough.

It has been reported by Weegels and Hamer (1992), Bekes et al. (1992) and Bushyk et al. (1990) that lipids present in dough interact with specific gluten complex proteins to form lipid-gluten aggregates during dough preparation.

Without being limited to any theory, it is presently believed that lipase used in accordance with the present invention modifies the interaction between lipid and gluten protein reported in the above cited references and thereby improves properties of dough and baked products. Although the nature of the interaction between lipid and gluten is unknown, it is contemplated that lipase reduces a possible lipid-gluten over-aggregation in the dough by exerting a limited attack on the lipid component of the aggregates without, however, making a total degradation of the aggregates. This modification of lipid-gluten aggregates is believed to result in an improved gluten complex, and thus an improved dough consistency, an enlarged bread volume and a better crumb structure as compared to the properties obtained when no lipase is added.

Furthermore, it is believed that lipase forms an "in situ" emulsifier comprising mono- and diglycerides in dough, which emulsifier is responsible for the improved anti-staling effect observed in accordance with the invention.

For the preparation of dough and/or baked products comprising only low amounts of added fat it is preferred that the amount of added fat constitutes at the most 3% by weight of the flour component(s) of the dough, preferably at the most 2.8% by weight of the flour component(s), such as at the most 2.5% by weight, more preferably at the most 2.0% by weight of the flour component(s) of the dough, still more preferably at the most 1.5% by weight, even more preferably at the most 1.0% by weight and most preferably at the most 0.5% by weight of the flour component(s) of the dough.

While it is contemplated that lipases of any origin, including animals and plants, may be used in the method of the invention in which no or only low amounts of fat are added, microbial lipases are preferred inter alia, because such lipases may normally be prepared in large amounts by fermentation of suitable microorganisms. Furthermore, microbial lipases may generally be obtained in a higher purity than other types of lipases, resulting in a lower amount of undesirable side-activities, such as undesirable non-lipase enzymatic activities.

The microbial lipases to be used in the methods of the invention may be of bacterial, yeast or fungal origin, and suitable examples include a lipase derived from a strain of Humicola spp., Rhizomucor spp., Candida spp., Aspergillus spp., Rhizopus spp. or Pseudomonas spp., especially from a strain of *H. lanuginosa, Rh. miehei, C. antarctica, Aspergillus niger* or *Pseudomonas cepacia*. Specific examples of such lipases are lipase A and lipase B of *C. antarctica*, e.g. described in WO 88/02775, the *Rh. meihei* lipase described by Boel et al., 1988, Huge-Jensen et al., 1989 and in EP 238 023, the *H. lanuginosa* lipase described in EP 305 216, and the *P. cepacia* lipase described in EP 214 761 and WO 89/01032.

The lipases may be obtained from the microorganism in question by use of any suitable technique. For instance, a lipase preparation may be obtained by fermentation of a microorganism and subsequent isolation by a method known in the art, but more preferably by use of recombinant DNA techniques as known in the art. Such method normally comprises cultivation of a host cell transformed with a recombinant DNA vector capable of expressing and carrying a DNA sequence encoding the lipase in question, in a culture medium under conditions permitting the expression of the enzyme and recovering the enzyme from the culture.

The DNA sequence encoding the lipase to be used may be of any origin, e.g. a cDNA sequence, a genomic sequence, a synthetic sequence or any combination thereof. Examples of suitable methods of preparing microbial lipases are described in, e.g. EP 0 238 023 and EP 0 305 216.

The enzyme preparation to be used in the methods of the present invention may comprise other enzymatic activities (further discussed below) or may comprise lipase as the only or major enzymatic activity. The term "major enzymatic activity" is intended to indicate that the predominant enzymatic activity is a lipase activity, i.e. that only low amounts of non-lipase enzymatic acitivities are present in the lipase preparation. Such non-lipase activities may contribute to the final result obtained for dough and/or baked products prepared by the enzyme preparation, although not in any significant manner. It will be understood that an enzyme preparation comprises lipase in a substantially pure form is preferred.

As compared to methods in which enzyme preparations containing a number of different enzymatic activities are used, the use of an enzyme preparation having only one major well-defined enzymatic activity is obviously attractive from the point of view that it is possible to more carefully regulate or control the extent of dough and/or bread-modification, and to obtain dough and/or baked products with more constant characteristics from one dough preparation or baking operation to the next.

Normally, the enzyme preparation to be used in the present invention is be added in an amount which, in the dough, results in a lipase activity in the range of 10–100,000 LU/kg of flour. A lipase activity below 10 LU/kg of flour is believed to provide no substantial effect, while a lipase activity above 100,000 LU/kg of flour is believed to result in an over-modification of the dough, e.g. a dough which is too sticky.

It is preferred that the lipase preparation is added in an amount which, in the dough, results in a lipase activity in the range of 10–50,000 LU/kg of flour, such as in the range of 50–50,000 LU/kg of flour, 10–3000 LU/kg of flour, 10–2500 LU/kg of flour, 10–2100 LU/kg of flour or 10–2000 LU/kg of flour. From the results shown in the examples below it may be observed that very advantageous effects on dough and bread are obtained when using a lipase preparation in an amount corresponding to a lipase activity in the range of 250–2100 LU/kg of flour, such as 500–2100 LU/kg of flour or 250–1500 LU/kg of flour.

The enzyme preparation to be used in the present invention may advantageously be used in combination with other dough conditioners or bread improvers.

As indicated above, the enzyme preparation to be used in a method of the invention may comprise one or more enzyme activities in addition to the lipase, e.g. activities which are produced by or recovered from the lipase source in question. Thus, any other components present in the enzyme preparation may be of a different or the same origin as the lipase. Alternatively, one or more additional enzyme activities may be added separately from the enzyme preparation comprising the lipase.

Examples of other enzymes are a cellulase, a hemicellulase, a pentosanase such as xylanase (useful for the partial hydrolysis of pentosans which increases the extensibility of the dough), a glucose oxidase (useful for strengthening the dough), e.g. a fungal glucose oxidase such as Novozym 358® (a *A. niger* glucose oxidase), a protease (useful for gluten weakening in particular when using hard wheat flour), e.g. Neutrase®, a peroxidase (useful for improving dough consistency), a peptidase, a maltogenase, and/or an amylase, such as an amyloglucosidase (e.g. AMG® (an *A. niger* amyloglucosidase) and an α-amylase (useful for providing sugars fermentable by yeast). The other enzymes are preferably of microbial origin and may be obtained by conventional techniques used in the art as mentioned above.

A generally observed drawback when using pentosanase for baking is that the dough obtains an undesirable stickiness. It has surprisingly been found that lipase may reduce or avoid said stickiness. Accordingly, in one embodiment of a method of the invention, lipase is advantageously used in combination with a pentosanase such as xylanase. The xylanase is preferably of microbial origin, e.g. derived from a bacterium or fungus, such as a strain of Aspergillus, in particular of *A. aculeatus, A. niger* (cf. WO 91/19782), *A. awamori* (WO 91/18977), or *A. tubigensis* (WO 92/01793), from a strain of Tricnoderma, e.g. *T. reesei,* or from a strain of Humicola, e.g. *H. insolens* (WO 92/17573, the contents of which is hereby incorporated by reference). Pentopan® and Novozym 384® (both from Novo Nordisk A/S) are commercially available xylanase preparations produced by *Trichoderina reesei.*

In another embodiment of a method of the invention lipase is advantageously used in combination with an amylase such as an α-amylase or an amyloglucosidase. The amylase is preferably of microbial origin, e.g. derived from a bacterium or fungus, such as a strain of Aspergillus, in particular of *A. niger* or *A. oryzae,* or a strain of Bacillus. commercially available α-amylases suited for the present purpose are Fungamyl® (an *A. oryzae* α-amylase), Novamyl® (a *B. stearothermophilus* α-amylase, cf. EP 120 693), and BAN® (a *B. amyloliquefaciens* α-amylase) all available from Novo Nordisk A/S.

When the lipase is used in combination with an other enzyme, a preferred dosage of the lipase is 10–50,000 LU/kg of flour. The other enzyme activities may be dosed in accordance with established baking practice. In this respect, a preferred dosage of xylanase is 5–5000 FXU/kg of flour and a preferred dosage of amylase is 5–500 FAU/kg of flour.

The xylanase activity FXU (Farbe-Xylanase-Units) and the α-amylase activity FAU may be determined by the procedure given in the Materials and Methods section below.

Besides the above mentioned additional enzyme activities a microbially produced lipase preparation may contain varying minor amounts of other enzymatic activities inherently produced by the producer organism in question.

The enzyme preparation to be used in the method of the invention may be in any form suited for the use in question, e.g. in the form of a dry powder or granulate, in particular a non-dusting granulate, a liquid, in particular a stabilized liquid, or a protected enzyme. Granulates may be produced, e.g. as disclosed in U.S. Pat. Nos. 4,106,991 and 4,661,452, and may optionally be coated by methods known in the art. Liquid enzyme preparations may, for instance, be stabilized by adding nutritionally acceptable stabilizers such as a sugar, a sugar alcohol or another polyol, lactic acid or another organic acid according to established methods. Protected enzymes may be prepared according to the method disclosed in EP 238,216.

Normally, for inclusion in pre-mixes or flour it is advantageous that the enzyme preparation is in the form of a dry product, e.g. a non-dusting granulate, whereas for inclusion together with a liquid it is advantageously in a liquid form.

As mentioned above, the lipase is believed to form an in situ emulsifier and in one embodiment it is thus contemplated to serve as a substituent for emulsifiers which are normally used for improving dough extensibility and to a certain extent for improving the consistency of bread (making it easier to slice), as well as for improving the storage stability of the bread.

However, the lipase preparation may also be used alongside conventional emulsifiers so as to achieve a better improving effect, which can not be achieved by using one or two emulsifiers alone. Examples of such emulsifiers are mono- or diglycerides, e.g. DATEM and SSL, diacetyl tartaric acid esters of mono- or diglycerides, sugar esters of fatty acids, polyglycerol esters of fatty acids, lactic acid esters of monoglycerides, acetic acid or citric acid esters of monoglycerides, polyoxyethylene stearates, phospholipids and (for the preparation of low fat-containing dough) lecithin.

The enzyme preparation may be added as such to the mixture from which the dough is made, or may, alternatively, be added as a constituent of a dough conditioner and/or a bread-improving composition. The dough conditioner and/or the bread-improving composition may be any conventionally used composition, e.g. comprising one or more of the following constituents:

A milk powder (providing crust colour), an emulsifier (such as mentioned above), granulated fat (for dough softening and consistency of bread), and oxidant (added to strengthen the gluten structure; e.g. ascorbic acid, potassium bromate, potassium iodate or ammonium persulfate), an amino acid (e.g. cysteine), a sugar, salt (e.g. sodium chloride, calcium acetate, sodium sulfate or calcium sulfate serving to make the dough firmer) and (for the preparation of low fat-containing dough gluten (to improve the gas retention power of weak flours).

Typically, the dough conditioner and/or the bread-improving composition is added in an amount corresponding to about 1–5%, such as 1–3% of the added flour.

The methods of the present invention is contemplated to be useful in improving the machinability of any type of dough. of course, the improved machinability is particularly important for dough types to be processed industrially, an example of which is dough types which are to be extruded (e.g. for the preparation of bisquits or crisp bread types). The use of lipase in such types of bread are believed to have no influence on the texture of the resulting product which means that no undesirable softening of products which are to be crisp are obtained. Furthermore, the use of lipase is considered to have no negative influence on the flavour of the resulting baked products, but is rather expected to improve the flavour.

As it is indicated above, the term "baked product" is intended to include any product prepared from dough. The baked product may be yeast-leavened or chemically leavened and may be of a soft or a crisp character. Examples of baked products, whether of a white, light or dark type, which may advantageously be produced by the present invention are bread, typically in the form of loaves or rolls, French baguette-type bread, pita bread, tacos, cakes, pan-cakes, bisquites, crisp bread and the like.

The dough and/or baked product prepared by the method of the invention are normally based on wheat meal or flour, optionally in combination with other types of meal or flour such as corn flour, rye meal, rye flour, oat flour or meal, soy flour, sorghum meal or flour, or potato meal or flour. However, it is contemplated that the method of the present invention will function equally well in the preparation of dough and baked products primarily based on other meals or flours, such as corn meal or flour, rye meal or flour, or any other types such as the types of meal or flour mentioned above.

As mentioned above the lipase preparation is added to any mixture of dough ingredients, to the dough, or to any of the ingredients to be included in the dough, in other words the lipase preparation may be added in any step of the dough preparation and may be added in one, two or more steps, where appropriate. However, the lipase should not be added together with any strong chemical or under conditions where the enzyme is inactivated.

The handling of the dough and/or baking is performed in any suitable manner for the dough and/or baked product in question, typically including the steps of kneading of the dough, subjecting the dough to one or more proofing treatments, and baking the product under suitable conditions, i.e. at a suitable temperature and for a sufficient periode of time. For instance, the dough may be prepared by using a normal straight dough process, a sour dough process, an overnight dough method, a low-temperature and long-time fermentation method, a frozen dough method, the Chorleywood Bread process, and the Sponge and Dough process.

In a further aspect the present invention relates to a dough or a baked product prepared by the method of the present invention. The dough and the baked product of the invention has improved qualities as defined above as compared with products which has not been prepared according to the invention. The baked product and the dough of the invention may be of any of the types discussed above, and it is preferred that the dough is fresh or frozen.

The dough conditioner and/or a bread-improving composition of the invention which is substantially free from vital gluten or lecithin and which comprises a microbial lipase may be prepared on the basis of conventional dough conditioners and/or bread-improving compositions known in the art using procedures known in the art. Specific examples of suitable constituents for dough conditioners and/or bread-improving compositions are listed above.

The pre-mix of the invention which is substantially free from added fat and which comprises a lipase enzyme may be prepared by techniques known in the art on the basis of pre-mix constituents known in the art such as flour, meal, dough-conditioners, bread-improving additives and the like.

As explained above, it was surprisingly found that lipase as such exerts an advantageous effect of dough and baked products when included in the mixture from which the dough is prepared thus resulting in a novel use of lipase as such. Accordingly, in a further important aspect the present invention relates to the use of lipase as a dough conditioner and/or a bread-improving agent for the preparation of dough and/or baked products substantially free from added fat or comprising at the most 3.5% of added fat by weight of the flour components of the dough.

When the dough contains added fat it is preferred that the amount of added fat constitutes at the most 3% by weight of the flour component(s) of the dough, such as at the most 2.8% or 2.5% by weight, more preferably at the most 2.0% by weight of the flour components of the dough, such as at the most 1.5% by weight of the flour components, in particular at the most 1.0% by weight and most preferably at the most 0.5% by weight of the flour components of the dough.

The lipase to be used as a dough conditioner and/or bread-improving agent is preferably a lipase as defined above and may be used in the amounts stated above.

The present invention is further illustrated in the following example which is not considered, in any manner, to limit the scope of the invention as defined herein.

MATERIALS AND METHODS

Enzymes

Lipase A: The *Humicola lanuginosa* lipase described in EP 305 216 and produced by recombinant DNA techniques in *Aspergillus oryzae* as described in EP 305 216.

Lipase B-I and Lipase B-II: The *Rhizomucor miehei* lipase described by Boel et al., 1988 and produced by recombinant DNA techniques in *A. oryzae* as described by Huge-Jensen et al., 1989 and in EP 228 023. Lipase B-I and Lipase B-II differ in their specific activity as further specified in Table 1 below.

Lipase C: A *Pseudomonas cepacia* lipase produced by the *P. cepacia* strain DSM 3959 and further described in WO 89/01032.

Palatase M: A commercial *Rhizomucor miehei* lipase preparation available from Novo Nordisk A/S.

The activity profiles of the above mentioned lipase enzymes appear from Table 1 below.

Xylanase: A xylanase produced by the *Humicola insolens* strain DSM 1800 available from the Deutsche Sammlung von Mikroorganismen und Zellkulturen GmbH and further described in EP 507 723.

Fungamyl: A commercial fungal α-amylase preparation available from Novo Nordisk A/S.

TABLE 1

| Lipase | LU/g | FAU/g |
| --- | --- | --- |
| Lipase A | 4,452,000 | <0.6 |
| Lipase B-I | 12,200 | 9 |
| Lipase B-II | 1,076,000 | 1558 |
| Lipase C | 301,000 | <0.6 |
| Palatase M | 940 | <0.6 |

LU/g (Lipase Units/g) and FAU/g (Fungal alpha-Amylase Units/g) were determined by the following assays:

LU—Lipase Units

Lipase activity was assayed using glycerine tributyrat as a substrate and gum-arabic as an emulsifier. 1 LU (Lipase Unit) is the amount of enzyme which liberates 1 $\mu$mol titratable butyric acid per minute at 30° C., pH 7.0. The lipase activity was assayed by pH-stat using Radiometer titrator VIT90, Radiometer, Copenhagen. Further details of the assay are given in Novo Analytical Method AF 95/5, available on request.

FAU—Fungal Alpha-Amylase Units

1 FA-unit (FAU) is the amount of enzyme which at 37° C. and pH 4.7 breaks down 5260 mg of solid starch per hour. Further details of the assay are given in Novo Analytical Method AF 9.1/3, available on request.

FXU—Xylanase Activity

The endo-xylanase activity is determined by an assay, in which the xylanase sample is incubated with a remazol-xylan substrate (4-O-methyl-D-glucurono-D-xylan dyed with Remazol Brilliant Blue R, Fluka), pH 6.0. The incubation is performed at 50° C. for 30 min. The background of non-degraded dyed substrate is precipitated by ethanol. The remaining blue colour in the supernatant is determined spectrophotometrically at 585 nm and is proportional to the endoxylanase activity.

The endoxylanase activity of the sample is determined relatively to an enzyme standard.

The assay is further described in the publication AF 293.6/1-GB, available upon request from Novo Nordisk A/S, Denmark.

Preparation of Bread

In Example 1, white bread were prepared from the following basic recipe:

| Basic Recipe | | |
| --- | --- | --- |
| Wheat flour | 1 kg | 100% |
| Cold tap water | 550 ml | 55% |
| Fresh yeast | 50 g | 5% |
| Salt | 20 g | 2% |
| Margarine | 60 g | 6% |

The wheat flour was of the type termed "Manitoba" supplied by "Valsemøllerne", Denmark, August 1991. The yeast was conventional yeast obtained from "De Danske Spritfabrikker" (Danisco), Denmark.

The cold water was added to a mixture of the dry ingredients. The resulting mixture was mixed for 3 minutes at 110 rpm and subsequently 8 minutes at 260 rpm using a spiral mixer, i.e. a Bear (Bjørn) Varimixer. The resulting dough was divided into portions of 350 g and subsequently allowed to rise for 40 minutes at room temperature and subsequently subjected to a second proofing in a proofing cabinet at 35° C. and 70 RH for 50 minutes. Baking was performed in tins at 225° C. for 30 minutes.

In Examples 2–7 the following basic recipe and procedure was used:

| Basic recipe | |
| --- | --- |
| Flour(Manitoba) | 100% |
| Salt | 1.5% |
| Yeast | 5.0% |
| sugar | 1.5% |
| Water | 54% |

Procedure

1. Dough mixing (Spiral mixer)
   2 min. at 700 RPM
   7 min. at 1400 RPM the mixing time was determined and adjusted by a skilled baker so as to obtain an optimum dough consistency under the testing conditions used.

2. 1st proof: 30° C.–80% RH, 16 min.
3. Scaling and shaping;
4. Final proof: 32° C.–80% RH, 40 min.;
5. Baking: 225° C., 20 min. for rolls and 30 min for loaf.

Evaluation of Dough and Baked Products

Dough and baked products described in Example 1 were evaluated visually. The volume of the baked products was determined as further described below.

Properties of the dough and baked products described in Examples 2–7 were determined as follows:

Roll specific volume: the volume of 20 rolls are measured using the traditional rape seed method. The specific volume is calculated as volume ml per g bread. The specific volume of the control (without enzyme) is defined as 100. The relative specific volume index is calculated as:

$$\text{Specific vol. index} = \frac{\text{specific volume of 20 rolls}}{\text{specific volume of 20 control rolls}} * 100$$

Loaf specific volume: the mean value of 4 loaves volume are measured using the same methods as described above.

The dough stickiness and crumb structure are evaluated visually according to the following scale:

| Dough stickiness: | almost liquid | 1 |
| --- | --- | --- |
| | too sticky | 2 |
| | sticky | 3 |
| | normal | 4 |
| | dry | 5 |
| Crumb structure: | very poor | 1 |
| | poor | 2 |
| | non-uniform | 3 |
| | uniform/good | 4 |
| | very good | 5 |

The softness of bread crumb is measured by a SMS-Texture Analyzer. A plunger with a diameter of 45 mm is pressed on the middle of a 20 mm thick slice of bread, The force needed for the plunger to depress the crumb 5 mm with a speed of 2.0 mm/s is recorded and it is expressed as the crumb firmness. The lower the value, the softer is the crumb. Four slices of each bread are measured and the mean value is used.

EXAMPLES

Example 1

White bread containing 6% of added fat were prepared on the basis of the standard procedure described above and the results shown in Table 2 were obtained:

TABLE 2

| Lipase | Lipase B-I | | |
|---|---|---|---|
| Dosage | | | |
| LU/kg of flour | 10 | 100 | 1000 |
| g/100 kg | 0.1 | 1 | 10 |
| FAU/100 kg | 1 | 10 | 100 |
| Volume* (%) | 101 | 105 | 111 |
| Softness* | | | |
| Day 1 | + | ++ | +++ |
| Day 2 | 0 | 0 | + |
| Effect on dough | | Some softening | |

*= relative to a reference without lipase added.

"0" means that the crumb is similar to that of the control, + means that the crumb is slightly softer, ++ means that the crumb is softer, and +++ means that the bread is considerable more soft than the control.

It is apparent that the use of a microbial lipase in the preparation of the dough and the baked product has a positive effect on dough softness as well as on the crumb structure and the volume of the baked product.

Example 2

The enzyme used was lipase A, i.e. a recombinant *H. lanuginosa* lipase. The enzyme was added either directly into the baking ingredients mix or it was dispersed in water before being added to the mix. All tests were carried out in duplicate and the results were similar. The following results were obtained:

TABLE 3

| Lipase A | 1 | 2 | 3 | 4 | 5 | 6 | 7 | 8 |
|---|---|---|---|---|---|---|---|---|
| LU/kg flour | 250 | 500 | 1000 | 1500 | 10000 | 20000 | 50000 | 0 |
| Dough stickiness | All dough are good to work with. | | | | | | | |
| Roll specific vol index | 119 | 124 | 122 | 122 | 113 | 111 | 103 | 100 |
| Loaf specific vol index | 111 | 112 | 118 | 112 | 111 | 108 | 104 | 100 |
| Crumb structure | 3.5 | 3 | 3.5 | 3.5 | 4 | 4 | 4 | 4 |
| Softness/0 | 349 | 314 | 244 | 318 | 334 | 403 | 411 | 595 |
| Softness/24 hr | 705 | 541 | 559 | 627 | 606 | 656 | 735 | 1040 |
| Softness/96 hr | 988 | 1088 | 1049 | 1252 | 1091 | 1224 | 1261 | 1754 |

It is apparent from the above results that the addition of lipase increases the volume of rolls and loaves and improves the crumb structure and the crumb softness during storage. Furthermore, the lipase was found to have a significant effect on crumb whitness.

Example 3

Baking tests were carried out by use of lipase B-II, i.e. a recombinant *Rh. mucor* lipase, using the above described procedure. The results obtained are apparent from Table 4 below. It is apparent that the use of the *Rh. miehei* lipase results in improved volume, crumb structure and crumb softness after storage. The addition of lipase B-II also results in a whitening of the crumb.

TABLE 4

| Lipase B-II | 1 | 2 | 3 | 4 | 5 | 6 | 7 |
|---|---|---|---|---|---|---|---|
| LU/kg flour | 250 | 500 | 1000 | 1500 | 10000 | 20000 | 0 |
| Dough stickiness | All dough are good to work with. | | | | | | |
| Roll specific vol index | 115 | 122 | 123 | 127 | 108 | 111 | 100 |
| Loaf specific vol index | 105 | 111 | 111 | 112 | 106 | 108 | 100 |
| Crumb structure | 3 | 4 | 4 | 4 | 4 | 4 | 4 |
| Softness/0 | 460 | 415 | 357 | 350 | 380 | 441 | 595 |
| Softness/24 hr | 833 | 780 | 693 | 712 | 680 | 668 | 1040 |
| Softness/72 hr | 1382 | 1153 | 1119 | 1066 | 1114 | 1060 | 1754 |

Example 4

Baking tests were carried out by use of the commercially available lipase preparation Palatase M® using the above described procedure, and the following results were obtained:

TABLE 5

| Palatase M | 7 | 8 | 9 | 10 | 11 | 12 |
|---|---|---|---|---|---|---|
| LU/kg flour | 0 | 250 | 500 | 1000 | 1500 | 5000 |
| Dough stickiness | All dough are good to work with. | | | | | |
| Roll specific vol index | 100 | 112 | 113 | 121 | 125 | 121 |
| Loaf specific vol index | 100 | 103 | 109 | 114 | 116 | 113 |
| Crumb structure | 4 | 4 | 3.5 | 3 | 3.5 | 3.5 |
| Softness/0 | 595 | 511 | 343 | 285 | 281 | 292 |
| Softness/24 hr | 1040 | 909 | 672 | 592 | 555 | 600 |
| Softness/72 hr | 1754 | 1616 | 1192 | 1040 | 891 | 1001 |

Example 5

Baking tests were carried out by use of lipase C, i.e. a *P. cepacia* lipase, using the above described procedure. The following results were obtained:

TABLE 6

| Lipase C | 1 | 2 | 3 | 4 | 5 | 6 | 7 |
|---|---|---|---|---|---|---|---|
| LU/kg flour | 250 | 500 | 1000 | 1500 | 10000 | 20000 | 0 |
| Dough stickiness | All dough are good to work with, no 5 6 are little dry | | | | | | |

TABLE 6-continued

| Lipase C | 1 | 2 | 3 | 4 | 5 | 6 | 7 |
|---|---|---|---|---|---|---|---|
| Roll specific vol index | 124 | 135 | 127 | 132 | 116 | 116 | 100 |
| Loaf specific vol index | 116 | 118 | 116 | 117 | 113 | 113 | 100 |
| Crumb structure | 2.5 | 4 | 4 | 4 | 4 | 4 | 3 |
| Softness/0 | 330 | 300 | 319 | 388 | 406 | 381 | 642 |
| Softness/24 hr | 600 | 567 | 631 | 738 | 650 | 615 | 1104 |
| Softness/72 hr | 1016 | 993 | 1081 | 1084 | 1094 | 1048 | 1720 |

Example 6

In order to evaluate whether lipase could advantageously be used in combination with other enzymes, baking tests were carried out with Lipase A, Lipase B-II, Lipase C and Palatase M®, respectively, in combination with α-amylase. The α-amylase used was Fungamyl®.

Similar results were obtained by use of each of the above mentioned lipases, and as an representative example of these results, the results obtained from the use of Lipase A in combination with Fungamyl® are given in Table 7 below.

From Table 7 it is apparent that bread prepared with a microbial lipase in combination with alpha-amylase have a larger volume and a better crumb structure than bread prepared with one of the enzymes alone. Furthermore, the addition of lipase reduce the dough stickiness which may normally be found, when a fungal α-amylase is used alone for baking.

TABLE 7

| | 1 | 2 | 3 | 4 | 5 | 6 | 7 | 8 | 9 | 10 |
|---|---|---|---|---|---|---|---|---|---|---|
| Lipase A/LU pr kg flour | 0 | 250 | 500 | 1000 | 1500 | 0 | 250 | 500 | 1000 | 1500 |
| Fungamyl/FAU pr kg flour | 0 | 50 | 50 | 50 | 50 | 50 | 0 | 0 | 0 | 0 |
| Dough stickiness | 4 | 3 | 3,5 | 4 | 4 | 3 | 4 | 4 | 4 | 4 |
| Roll sp vol index | 100 | 134 | 142 | 138 | 143 | 111 | 119 | 124 | 122 | 122 |
| Loaf sp vol index | 100 | 119 | 123 | 128 | 127 | 110 | 111 | 112 | 118 | 112 |
| Crumb structure | 3 | 4.5 | 4.5 | 5 | 5 | 4 | 3.5 | 3 | 3.5 | 3.5 |
| Softness | 398 | 264 | 263 | 300 | 275 | 265 | 356 | 446 | 308 | 293 |
| Softness/24 hr | 1076 | 464 | 557 | 493 | 482 | 532 | 864 | 879 | 659 | 628 |
| Softness/72 hr | 1727 | 1093 | 1002 | 806 | 1055 | 1214 | 1251 | 1301 | 1001 | 946 |

Example 7

Pentosanases such as xylanase are known to have good baking effect. However, it is also commonly known that pentosanase can cause dough stickiness. It was therefor tested whether lipase could be used to avoid or reduce the increased dough stickiness caused by the pentosanase xylanase, when used alone. More specifically, baking tests were performed (by use of the above stated general procedure) with Lipase A, Lipase B-II, Lipase C and Palatase M®, respectively, in combination with a *H. insolens* xylanase. Similar results were obtained for each of the lipase enzymes, and as a representative example the results obtained by use of Lipase A in combination with the xylanase are given in Table 8 below.

From Table 8 it is apparent that the stickiness caused by xylanase is reduced or disappeared, when this enzyme is used in combination with lipase. Furthermore, the combination of lipase with xylanase provide larger volume, better crumb structure and less crumb staling than when lipase or xylanase is used alone.

TABLE 8

| | 1 | 2 | 3 | 4 | 5 | 6 | 7 |
|---|---|---|---|---|---|---|---|
| Lipase A/LU pr kg flour | 0 | 250 | 500 | 1000 | 1500 | 0 | 0 |
| Xylanase/FXU pr kg flour | 0 | 43 | 43 | 43 | 43 | 43 | 70 |
| Dough stickiness | 4 | 3,5 | 4 | 4 | 4 | 2,5 | 2,5 |
| Roll sp vol index | 100 | 136 | 143 | 134 | 140 | 120 | 127 |
| Loaf sp vol index | 100 | 116 | 122 | 119 | 119 | 108 | 118 |
| Crumb structure | 3 | 5 | 5 | 5 | 5 | 4 | 4.5 |
| Softness | 532 | 314 | 294 | 288 | 275 | 330 | 283 |
| Softness/24 hr | 1095 | 623 | 635 | 571 | 575 | 734 | 567 |
| Softness/72 hr | 1843 | 918 | 893 | 950 | 966 | 1370 | 1022 |

REFERENCES CITED IN THE SPECIFICATION

Bekes et al., Journal of Cereal Science 16, pp. 129–140, 1992
Boel et al., 1988, Lipids, Vol. 23, No. 7
Bushyk et al., "Carbohydrate and Lipid Complexes with Gliadin and Glutenin" in Gluten Proteins, Ed. W. Bushyk, American Association of Cereal Chemists, Minneapolis, 1990
Gams, 1976, Getreide Mehl und Brot, Technologishce Zeitschrift für Getreide, Mehl, Brot, Backwaren, 30. Jahrgang, Heft 5, pp. 113–116
Huge-Jensen et al., 1989, Lipids Vol. 24, No. 9
Weegels, P. L. and Hamer, R. J., Cereal Foods World 1992, vol. 37, No. 5, pp. 379–385.

What is claimed is:

1. An enzyme preparation comprising a lipase derived from Humicola, a second enzyme which is an amylase or a xylanase, and a baking dough ingredient.

2. The enzyme preparation of claim 1, wherein the lipase is derived from *Humicola lanuginosa*.

3. The enzyme preparation of claim 1, wherein the second enzyme is an amylase.

4. The enzyme preparation of claim 3, wherein the amylase is derived from Aspergillus.

5. The enzyme preparation of claim 4, wherein the amylase is derived from *Aspergillus oryzae*.

6. The enzyme preparation of claim 1, wherein the second enzyme is a xylanase.

7. The enzyme preparation of claim 6, wherein the xylanase is derived from Humicola.

8. The enzyme preparation of claim 7, wherein the xylanase is derived from *Humicola insolens*.

9. A dough comprising a lipase derived from Humicola and a second enzyme which is an amylase or a xylanase.

10. A method of increasing the volume of a baked product produced from a dough, comprising adding a lipase derived from Humicola and a second enzyme which is an amylase or a xylanase to the dough or to a dough ingredient.

11. The method of claim 10, wherein the lipase is derived from *Humicola lanuginosa*.

12. The method of claim 10, wherein the additional enzyme is an amylase.

13. The method of claim 12, wherein the amylase is derived from Aspergillus.

14. The method of claim 13, wherein the amylase is derived from *Aspergillus oryzae*.

15. The method of claim 10, wherein the enzyme is a xylanase.

16. The method of claim 15, wherein the xylanase is derived from Humicola.

17. The method of claim 16, wherein the xylanase is derived from *Humicola insolens*.

18. The method of claim 10, wherein the lipase is added in the amount of 250–2,000 LU/kg flour.

19. The method of claim 10, wherein the additional enzyme is an amylase added in the amount of 5–500 FAU/kg flour.

20. The method of claim 10, wherein the additional enzyme is a xylanase added in the amount of 5–5000 FXU/kg flour.

21. The method of claim 10, wherein the dough comprises up to 6% by weight of added fat.

22. The method of claim 10, wherein the dough comprises up to 3% by weight of added fat.

23. The method of claim 10, wherein the dough is essentially free from added fat.

24. A method of increasing crumb softness in a baked product produced from a dough, comprising adding a lipase derived from Humicola and a second enzyme which is an amylase or a xylanase to the dough or to a dough ingredient.

* * * * *